(12) United States Patent
Breuninger et al.

(10) Patent No.: US 7,946,614 B2
(45) Date of Patent: May 24, 2011

(54) OCCUPANT RESTRAINT DEVICE FOR A MOTOR VEHICLE

(75) Inventors: Martin Breuninger, Neu-Elm (DE); Josef Klima, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 211 days.

(21) Appl. No.: 12/213,480

(22) Filed: Jun. 19, 2008

(65) Prior Publication Data

US 2009/0008914 A1    Jan. 8, 2009

Related U.S. Application Data

(63) Continuation of application No. PCT/EP2006/012647, filed on Dec. 22, 2006.

(30) Foreign Application Priority Data

Dec. 23, 2005 (DE) .................... 10 2005 062 849

(51) Int. Cl.
*B60R 21/207* (2006.01)
*B60R 21/16* (2006.01)
*B60R 21/20* (2006.01)
*B60N 2/42* (2006.01)

(52) U.S. Cl. ............. 280/730.2; 280/730.1; 297/216.13

(58) Field of Classification Search ............... 280/730.2, 280/730.1; 297/216.1, 216.13

See application file for complete search history.

(56) References Cited

U.S. PATENT DOCUMENTS

| | | | |
|---|---|---|---|
| 5,505,487 A * | 4/1996 | Brown et al. ............. | 280/730.1 |
| 5,944,341 A | 8/1999 | Kimura et al. | |
| 6,959,944 B2 * | 11/2005 | Mori et al. ................. | 280/728.2 |
| 7,204,511 B2 * | 4/2007 | Mori et al. .................... | 280/731 |
| 7,234,727 B2 * | 6/2007 | Mori et al. ................. | 280/730.1 |
| 7,380,821 B2 * | 6/2008 | Higuchi ..................... | 280/743.1 |
| 7,726,733 B2 * | 6/2010 | Balser et al. ............... | 297/216.1 |
| 7,775,552 B2 * | 8/2010 | Breuninger et al. ....... | 280/730.2 |
| 2005/0156411 A1 * | 7/2005 | Steffens et al. ............... | 280/729 |
| 2005/0218632 A1 | 10/2005 | Cuevas et al. | |
| 2007/0252368 A1 | 11/2007 | Balser et al. | |

FOREIGN PATENT DOCUMENTS

| | | | |
|---|---|---|---|
| DE | 197 48 026 A1 | | 5/1999 |
| DE | 10057151 A1 | * | 6/2001 |
| DE | 100 43 290 C1 | | 4/2002 |
| DE | 100 56 961 A1 | | 6/2002 |
| DE | 10 2005 001 597 A1 | | 7/2006 |
| DE | 10 2005 002 464 A1 | | 7/2006 |

(Continued)

*Primary Examiner* — Paul N. Dickson
*Assistant Examiner* — Joselynn Y. Sliteris
(74) *Attorney, Agent, or Firm* — Foley & Lardner LLP (57) ABSTRACT

An occupant restraint device for a motor vehicle includes a supporting structure of the motor vehicle. The supporting structure includes an outer side facing an exterior of the vehicle and an inner side facing an interior of the vehicle. A vehicle seat includes an outer side facing the inner side of the supporting structure. A receptacle for an airbag is arranged on the outer side of the motor vehicle seat. An openable region is included on the receptacle such that the airbag can be deployed into the interior of the vehicle. A pre-crash detection device identifies an imminent application of force on the outer side of the supporting structure. The pre-crash detection device triggers a shifting of the receptacle from an inoperative position into an operative position along a direction of movement between the outer side of the vehicle seat and the inner side of the supporting structure.

16 Claims, 3 Drawing Sheets

FOREIGN PATENT DOCUMENTS

| | | |
|---|---|---|
| EP | 0 470 413 B1 | 2/1992 |
| FR | 2 830 814 A1 | 4/2003 |
| GB | 2 408 239 A | 5/2005 |
| GB | 2 410 011 A | 7/2005 |
| WO | WO 01/28819 A1 | 4/2001 |

* cited by examiner

FIG. 3

OCCUPANT RESTRAINT DEVICE FOR A MOTOR VEHICLE

CROSS-REFERENCE TO RELATED PATENT APPLICATIONS

This application is a Continuation of International Application PCT/EP2006/012647, filed Dec. 22, 2006, which was published in German as WO 2007/073944 on Jul. 5, 2007. The foregoing application is incorporated herein by reference in its entirety.

BACKGROUND

The present disclosure relates generally to the field of an occupant restraint device for a motor vehicle.

A conventional occupant restraint device includes a supporting structure of a motor vehicle. When fit in a motor vehicle, the supporting structure includes an outer side that faces an exterior space of the motor vehicle, an inner side that faces an interior of the motor vehicle, and a motor vehicle seat. The motor vehicle seat includes an outer side that faces the inner side of the supporting structure. Additionally, an airbag can be deployed in order to protect an occupant from an application of force taking place on the outer side of the supporting structure from the exterior space. A receptacle for the airbag is mounted on the motor vehicle seat. The airbag can be deployed into the interior of the motor vehicle through an openable region of the receptacle.

SUMMARY

One embodiment of the disclosure relates to an occupant restraint device for a motor vehicle including a supporting structure of the motor vehicle including an outer side facing an exterior space of the motor vehicle and an inner side facing an interior of the motor vehicle. A motor vehicle seat includes an outer side facing the inner side of the supporting structure. An airbag capable of being deployed to restrain an occupant upon an application of force on the outer side of the supporting structure from the exterior space. A receptacle of the airbag is arranged on the outer side of the motor vehicle seat. An openable region of the receptacle through which the airbag can be deployed into the interior of the motor vehicle. A pre-crash detection device for identifying an imminent application of force on the outer side of the supporting structure from the exterior space. The pre-crash detection device triggers a shifting of the receptacle from an inoperative position into an operative position along a direction of movement between the outer side of the motor vehicle seat and the inner side of the supporting structure upon identifying an imminent application of force.

BRIEF DESCRIPTION OF THE DRAWINGS

The disclosure will be explained in more detail with reference to the illustrative drawings.

DETAILED DESCRIPTION

According to various embodiments, an occupant restraint device may have improved deployment of an airbag, compared to conventional occupant restraint devices.

According to an exemplary embodiment, a pre-crash detection device may be provided. The pre-crash detection device may be configured to identify an imminent application of force that takes place on the outer side of the supporting structure from the exterior space. The pre-crash detection device, upon identifying an imminent application of force, may trigger a movement of the receptacle of the airbag from an inoperative position into an operative position. The movement may take place along a direction of movement directed from the outer side of the motor vehicle seat to the inner side of the supporting structure.

When the receptacle is deployed, a connection or coupling between the supporting structure and the motor vehicle seat (e.g. the seat back) is possible. The connection may oppose blocking of the airbag deployment space upon occurrence of an intrusion of the supporting structure during a side crash. Thus, the airbag's deployment into the interior of the motor vehicle may be improved.

As a result of the movement of the receptacle of the airbag from the inoperative position into the operative position, the openable region may be arranged between the inner side of the supporting structure and the outer side of the motor vehicle. Therefore, the airbag can be freely deployed in the straight ahead direction of travel between the inner side of the supporting structure and the outer side of the motor vehicle seat. Furthermore, the positioning reliability of the airbag may be improved.

Additionally, a movement generating device may be included for the optionally reversible movement of the receptacle of the airbag or of a complete airbag module arranged in the receptacle. The movement generating device may be coupled to the pre-crash detection device. Furthermore, when the pre-crash detection devices detects an imminent application of force (for example, a side crash), the movement generating device may shift the receptacle from the inoperative position into the operative position.

Furthermore, a pre-crash detection device may be configured and provided. When an imminent application of force taking place on the outer side of the supporting structure (lateral body) from the exterior space is identified, the pre-crash detection device may generate a first output signal that triggers the movement generating device.

Additionally, a gas generator for inflating the airbag may be provided. The gas generator generates or releases gas necessary for inflating the airbag when the receptacle is in an operative position.

The pre-crash detection device may be included to generate a second output signal that activates the gas generator to inflate the airbag if the receptacle is in the operative position. The pre-crash detection device may be configured to generate the second output signal when an imminent application of force directed at the supporting structure from the exterior space is detected.

Figure 1:
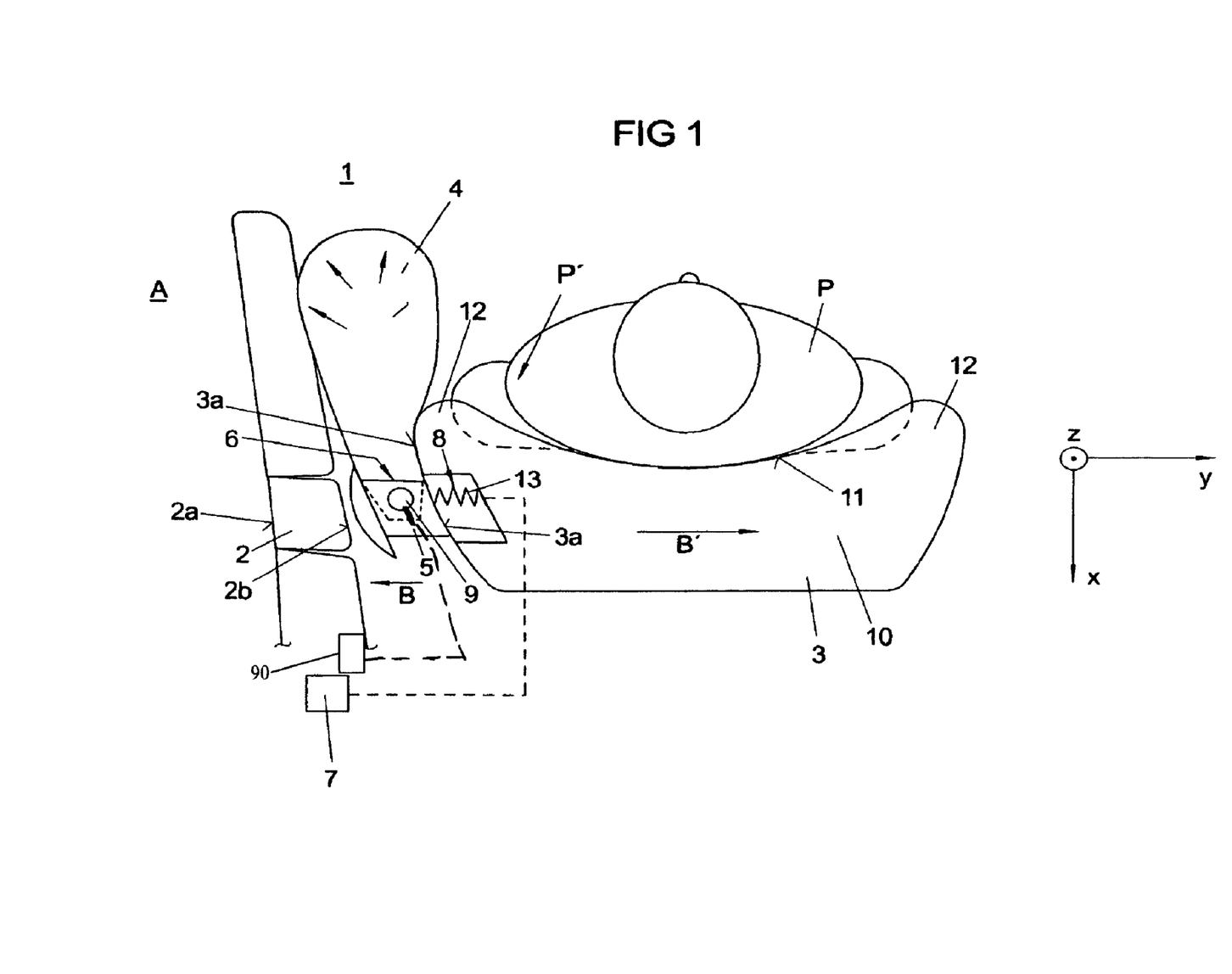
FIG. 1 shows a top view of an occupant restraint device with a deployable airbag according to an exemplary embodiment.

Additionally, a crash sensor (such as shown in FIG. 1 as reference numeral 90) may be included to activate the gas generator. The crash sensor may also activate the airbag when an application of force to the outer side of the supporting structure is detected by the crash sensor. Furthermore, the airbag may be activated only when the openable region is arranged outside the motor vehicle seat.

According to an exemplary embodiment the receptacle, when in an operative position, presses against the inner side of the supporting structure for the mechanical coupling to the supporting structure. Thus, in the event of an application of force acting on the outer side of the supporting structure, the receptacle may oppose a deformation of the supporting structure counter to the direction of movement. The receptacle may also reduce a blocking of the absorption path between the supporting structure and the vehicle seat.

According to an exemplary embodiment, the receptacle may be shifted along the direction of movement by the movement generating device. The receptacle may only be shifted to an extent such that the receptacle just touches the inner side of the supporting structure in the operative position. Thus, the receptacle may be supported on the inner side.

According to an exemplary embodiment, when the receptacle is shifting into the operative position, the receptacle may be pressed with a pre defined force against the supporting structure along the direction of movement by the movement generating device. As a result, the motor vehicle seat may deform counter to the direction of movement, enlarging the deployment space of the airbag or an absorption path between the supporting structure and the motor vehicle seat. More particularly, the deformation may occur to the back of the motor vehicle seat or to the side cheek emerging from the motor vehicle seat.

According to an exemplary embodiment, the motor vehicle seat may be mounted in a linearly displaceable manner counter to the direction of movement in the motor vehicle. During the displacement into the operative position, the receptacle may be pressed against the inner side of the supporting structure by the movement generating device, thus shifting the motor vehicle seat away from the supporting structure counter to the direction of movement. As a result, the absorption path can be enlarged, thereby reducing the risk of injury to an occupant in the motor vehicle seat during an intrusion of the supporting structure in the direction of the interior of the motor vehicle.

The receptacle may be designed as a rigid housing, with a region of weakness formed on the openable region of the receptacle. When the airbag inflates, the openable region may tear along the region of weakness. When inflated, the airbag may press against the openable region along the longitudinal axis of the vehicle. Therefore, the region of weakness can be formed linearly. The region of weakness in an openable region can be constructed in the form of a film, fabric, tear seam, adhesive bond, or any other material with a small material thickness.

The receptacle may completely surround the airbag before the openable region is opened. As a result, the risk of damage to the airbag upon deployment into the operative position may be limited. The gas generator may be similarly arranged in the receptacle or within the airbag.

According to an exemplary embodiment, for shifting from the inoperative position into the operative position, the receptacle may be mounted on the motor vehicle seat in a linearly displaceable manner along the direction of movement. More particularly, the receptacle may be mounted in a seat back of the motor vehicle seat that forms a bearing surface for the back of an occupant correctly occupying the motor vehicle seat. The seat back may include a side cheek that protrudes over the bearing surface of the seat back transverse to the direction of movement. The side cheek may be arranged along the direction of movement between the occupant occupying the seat and the supporting structure. The side cheek may be configured and provided in order to support a body side of the occupant that faces the supporting structure. An additional side cheek of similar type lies opposite the first side cheek along the transverse axis of the vehicle such that an occupant occupying the motor vehicle seat is at least partially arranged along the direction of movement (transverse axis y of the vehicle) between the two side cheeks.

The receptacle mounted on the seat back may be concealed in the inoperative position by an outermost covering of the seat back. Therefore, the receptacle in the inoperative position may not be perceived when looking at the motor vehicle seat.

According to an exemplary embodiment, the receptacle may be mounted in the seat back. Furthermore, the receptacle may be pressed against the inner side of the supporting structure during movement into the operative position. Therefore, the side cheek may abut against an occupant in the motor vehicle seat counter to the direction of movement of the receptacle when the receptacle shifts into the operative position.

The movement generating device includes at least one prestressable spring. The relaxation movement of the prestressable spring may generate the movement of the receptacle from the inoperative position into the operative position. As a result, the spring couples the receptacle to the backrest frame of the seat back that the receptacle is mounted on. Thus, the receptacle may move between the inoperative position and the operative position. The spring may prestress the receptacle against the backrest frame in the inoperative position. Thus, upon a relaxation movement of the spring, the receptacle may shift along the direction of movement into the operative position.

In order to lock the receptacle in the inoperative position, a first locking element may be included. The first locking element may be mounted on the receptacle such that the first locking element may move between two positions. The first locking element in the first position may prevent a relaxation movement of the spring. When the first locking element moves into the second position, the spring may be released such that the receptacle may be moved from the inoperative position into the operative position by the spring.

An additional movement generating device may be included. The movement generating device may interact with the pre-crash detection device for pivoting the first locking element into the second position. The additional movement generating device includes a magnetic coil configured to press a coupling element against the first locking element, thereby pivoting the first locking element from the first position into the second position. In the second position, the first locking element may release the spring.

The additional movement generating device may be triggered by an electronic control system that interacts with the magnetic coil. The electronic control system may, upon reception of the first output signal from the pre-crash detection device, activate the magnetic coil for pivoting the first locking element into the second position.

Additionally, a second locking element may be included. The second locking element may be configured to slide along a region of the backrest frame during movement of the receptacle between the inoperative position and the operative position. Furthermore, the second locking element may be prestressed against a region such that, as the second locking element slides along the region, the second locking element may engage at least one recess formed on the region.

The at least one recess may form an abutment for the receptacle. The abutment may absorb the forces acting on the receptacle counter to the direction of movement. As a result, the receptacle may resist being displaced counter to the direction of movement and out of the operative position when the second locking element is engaged with at least one recess.

A plurality of recesses may be provided on a region of the backrest frame. The recesses may be engaged by the second locking element as it slides along the region.

According to an exemplary embodiment, the second locking element may be designed as a lever that may pivot between two positions. In the first position, the second locking element may not engage any of the at least one recesses. In the second position, the second locking element may engage with at least one recess. The lever in the first position may be prestressed in the direction of the second position such that the lever may be pressed into at least one recess when sliding past a recess.

According to an exemplary embodiment, the receptacle may be designed such that it can be reversibly moved between the inoperative position and the operative position. Furthermore, when an application of force is foreseen by the pre-crash detection device and does not occur, the pre-crash detection device may provide a third output signal. The third output signal may trigger a shifting of the receptacle from the operative position back into the inoperative position.

The supporting structure may include a lateral body region, a lateral motor vehicle door and a motor vehicle pillar. Furthermore, the motor vehicle seat may be a driver's seat or a front passenger's seat of a motor vehicle.

Figure 2:
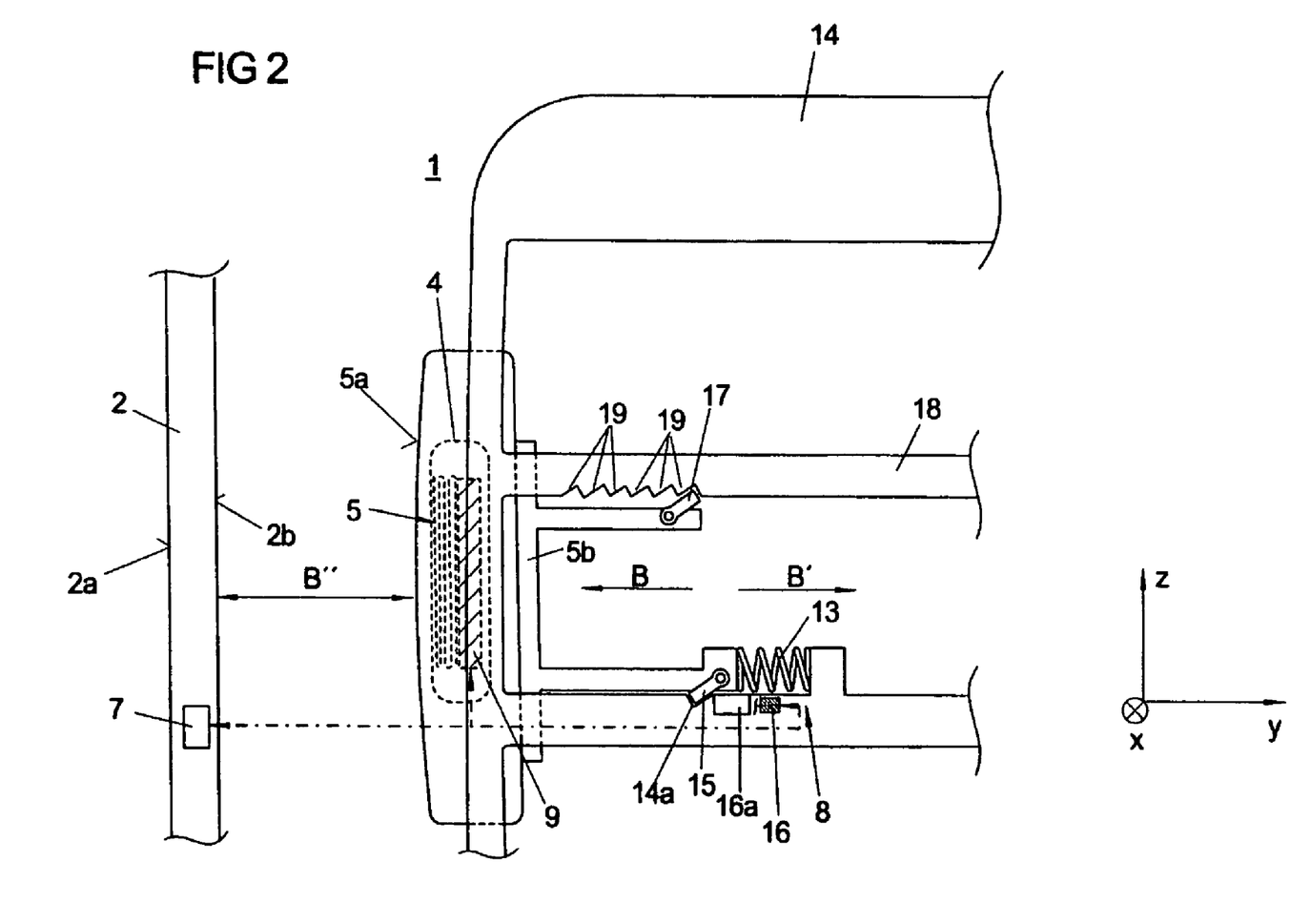
FIG. 2 shows a rear view of an occupant restraint device, according to an exemplary embodiment.

FIGS. 1 and 2 show a schematic view of an occupant restraint device 1 with a motor vehicle seat. The motor vehicle seat is designed as a driver's seat 3 with a supporting structure 2. The support structure 2 is arranged adjacent to the motor vehicle seat 3 and is a pillar B of a motor vehicle. The supporting structure 2 includes an outer side 2a that faces the exterior space A of the motor vehicle. An inner side 2b faces away from the outer side 2a and faces an outer side 3a of the motor vehicle seat 3.

The occupant restraint device 1 may protect an occupant P in the motor vehicle seat 3. More particularly, the occupant may be protected from an application of force from the exterior space A to the outer side 2a of the supporting structure 2 along a direction that includes at least one component along the transverse axis y of the vehicle. Similar applications of force usually occur in the event of a side crash, where a collision object (for example a motor vehicle) collides with a lateral body such as the outer side 2a of the supporting structure 2, of the motor vehicle.

In order to protect the occupant P, the occupant restraint device 1 includes an airbag 4 that may be inflated with gas from a gas generator 9. The airbag 4 and the gas generator 9, which is connected in a gas conducting manner to the airbag 4, may be arranged in a receptacle 5. The receptacle 5 may be designed as a rigid housing, with the exception of one housing side that faces the vehicle front along the longitudinal axis x of the vehicle and may be designed as a flexible, openable region 6. The openable region 6 may tear when the airbag 4, upon inflation, presses against the openable region 6.

The motor vehicle seat 3 may include a seat back 10. The seat back 10 may form a bearing surface 11 for the back of an occupant P correctly occupying the motor vehicle seat 3. Additionally, a backrest frame 14 may be included as a stiffening body. Along the longitudinal axis x of the vehicle, a side cheek 12 may project beyond the bearing surface 11 on a border region of the seat back 10. The border region may face the supporting structure 2 such that the side cheek 12 may be arranged at least in some sections along the transverse axis y of the vehicle between the body side P' of the occupant P and the supporting structure 2. Therefore, a body side P' of the occupant P may be supported with the body side facing the supporting structure 2.

Figure 3:
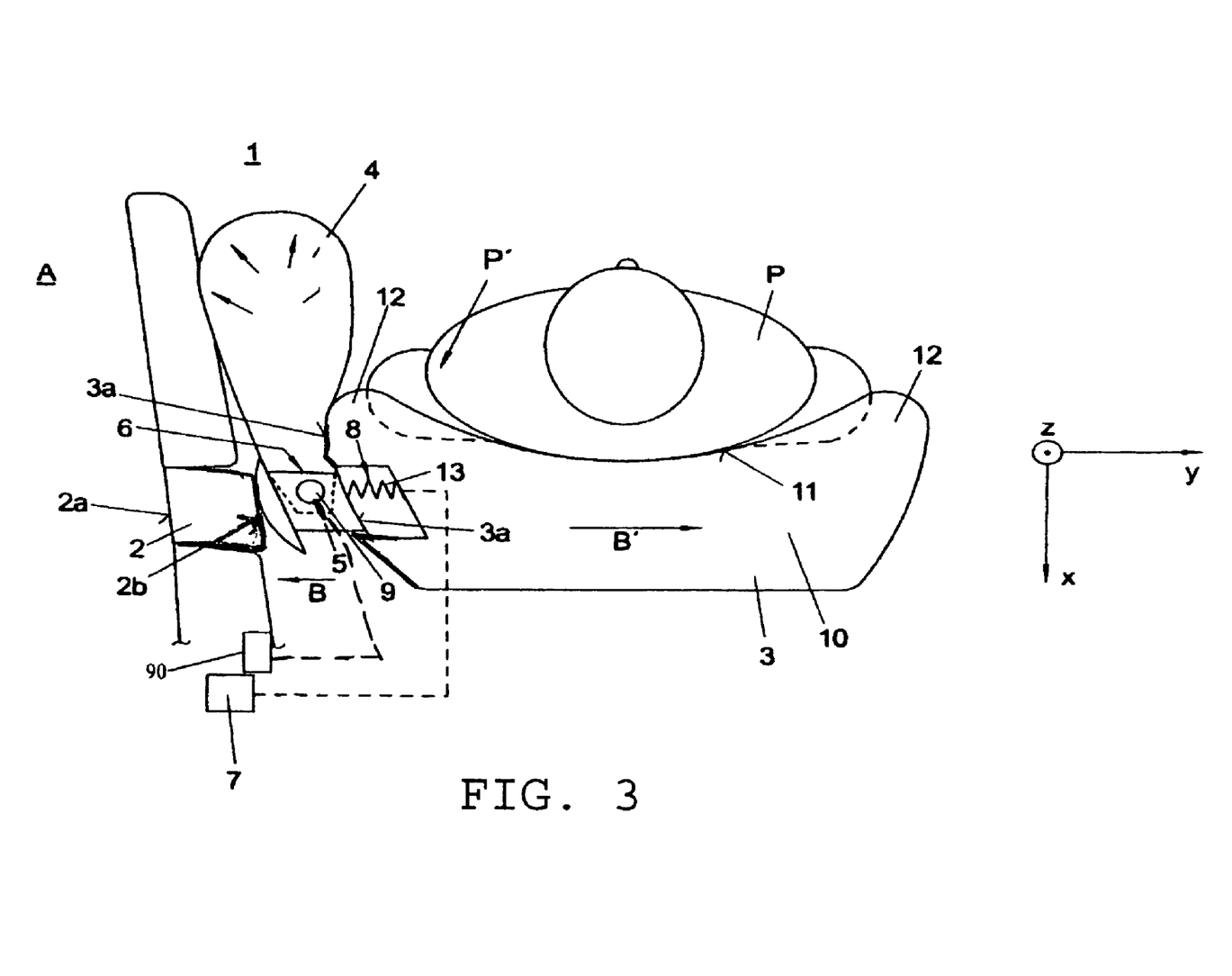
FIG. 3 shows a top view of the occupant restraint device with the deployment airbag in which the receptacle is shown contacting an inner side of a support structure and the seat is deformed (shown schematically).

The receptacle 5 may be mounted on the backrest frame 14 of the motor vehicle seat 3 in a linearly displaceable manner along a direction of movement B such that the receptacle can be moved from an inoperative position into an operative position. In the inoperative position, the receptacle 5 may be arranged completely within the seat back 10 of the motor vehicle seat 3. In the operative position, the receptacle 5 may be coupled mechanically to the supporting structure 2 by pressing against the inner side 2b of the supporting structure 2 along the direction of movement B. Thus, an intrusion and therefore a blocking of the absorption path B" (along the direction of movement B) may be opposed when a collision object with a movement component along the transverse axis y of the vehicle strikes from the exterior space A on the outer side 2a of the supporting structure 2. Additionally, when shifting into the operative position, the receptacle 5 may press against the inner side 2b of the supporting structure 2 such that a force is introduced into the motor vehicle seat 3 along a direction of force B' counter to the direction of movement B. The force may displace the motor vehicle seat toward the interior along the direction of force B'. The direction of force B' runs parallel to the transverse axis y of the vehicle. Therefore, the effective absorption path B" is extended in order to protect the occupant P.

During movement from the inoperative position into the operative position, the bearing side 5a of the housing 5 may abut against the inner side 2b of the supporting structure. The bearing side 5a may be of stable design such that good mechanical coupling to the supporting structure 2 is possible. In the inoperative position, the bearing side 5a may be embedded flush into the outer side 3a that faces the supporting structure 2 of the motor vehicle seat 3 or the seat back 10.

Furthermore, as a result of displacement of the receptacle 5 into the operative position, the openable region 6 may be positioned along the direction of movement B between the supporting structure 2 and the motor vehicle seat 3. Thus, the airbag 4 can be deployed freely (without obstruction) in the straight ahead direction of travel through the openable region 6 (that is opened) in order to protect the occupant P against a penetrating collision object.

A pre-crash detection device 7 may be included, allowing for the movement of the receptacle 5 to take place in a short amount of time. The pre-crash detection device may interact with a movement generating device 8 that moves the receptacle 5 from the inoperative position into the operative position and with the gas generator 9.

When the pre-crash detection device 7 identifies an imminent side crash, the pre-crash detection device 7 may generate a first output signal. The first output signal may trigger the movement generating device 8. The movement generating device 8 may then move the receptacle 5 from the inoperative position into the operative position. When a second output signal of the pre-crash detection device 7 is generated, the gas generator 9 may be fired, thereby deploying the airbag 4 from the receptacle 5 that is in the operative position. If the foreseen side crash can be averted, the pre-crash detection device 7 may generate a third output signal that triggers a movement of the receptacle 5 from the operative position into the inoperative position.

FIG. 2 shows a movement generating device 8 in detail. For the linearly displaceable mounting of the receptacle 5 on the backrest frame 14, the receptacle includes a support element 5b. The support element 5b, when in the inoperative position, is prestressed against the backrest frame 14 by a tensioned spring 13 such that a relaxation movement of the spring 13 shifts the receptacle 5 (together with the support 5b) along the direction of movement B toward the supporting structure 2.

To lock the receptacle 5 in the inoperative position, a first locking element 15 may be included. The first locking element 15 may be mounted on the support 5b such that the first locking element 15 may pivot between a first and a second position. In the first position, the first locking element 15 may engage with a recess 14a of the backrest frame 14. The recess may absorb the force that prestresses the spring 13 along the direction of movement B against the support 5b. In order to pivot the first locking element 15 into the second position, a magnetic coil 16 may be included. In the second position, the locking element 15 may release the support 5b such that the spring 13 can displace the receptacle 5 into the operative position. When the first signal of the pre-crash detection device 7 is received, the magnetic coil 16 may press a pin 16a against the first locking element 15 such that the first locking element 15 may disengage the recess 14a of the backrest frame 14. Furthermore, the receptacle 5 may be guided on the backrest frame 14 in a longitudinally displaceable manner along the direction of movement B via the support 5b. Thus, a controlled shifting of the receptacle 5 in the direction of the supporting structure 2 is possible.

During the shifting of the receptacle 5 into the operative position, a collision object may intrude into the supporting structure 2 and act against the receptacle 5. Thus, the receptacle 5 may be displaced back into the inoperative position counter to the direction of movement B. Therefore, a second locking element 17 may be included to prevent the receptacle 5 from being displaced back into the inoperative position. The second locking element 17 may be designed as a pivotable lever that may be mounted pivotably on the support 5b. When the receptacle 5 moves from the inoperative position into the operative position, the second locking element 17 may be prestressed against a region 18 of the backrest frame 14 extending along the transverse axis y of the vehicle and can slide along the backrest frame 14. The second locking element 17 may slide along the region 18 thereby latching into recesses 19 that are provided along the region 18. The recesses 19 may be designed such that the second locking element 17 automatically disengages from the recesses 19 during movement in the direction of the operating position. Additionally, each of the recesses 19 may act as an abutment for the support 5b of the receptacle 5 when the support is subjected to a force (intruding collision object) counter to the direction of movement B. Furthermore, the support 5b may be connected to the second locking element 17. More particularly, during the movement of the support 5b counter to the direction of movement B, the second locking element 17 may latch into a recess 19 of the region 18. Thus, the second locking element 17 can no longer be disengaged from the recess 19 unless a force oriented transverse to the direction of movement B pivots the second locking element 17 out of the recess 19. Additionally, a separate actuator may be included to prevent the second locking element 17 from being pivoted out of the recess 19.

A plurality of similar recesses 19 may be formed on the region 18 of the backrest frame 14 and along the entire movement path of the support 5b in the direction of movement B. Therefore, the second locking element 17 may find a recess 19 along the entire movement path when an intruding collision object acts on the receptacle 5 counter to the direction of movement B.

An occupant restraint device for a motor vehicle is disclosed herein. According to an embodiment the device includes a supporting structure of the motor vehicle including an outer side facing an exterior space of the motor vehicle and an inner side facing an interior of the motor vehicle. According to alternative embodiments, the supporting structure may include one or more of the following motor vehicle parts: a lateral body region, a lateral motor vehicle door, and a motor vehicle pillar. The device includes a motor vehicle seat including an outer side facing the inner side of the supporting structure. The device also includes an airbag configured to deploy to restrain an occupant upon an application of force on the outer side of the supporting structure from the exterior space. A receptacle of the airbag may be arranged on the outer side of the motor vehicle seat, and the receptacle includes an openable region through which the airbag can be deployed into the interior of the motor vehicle. The device includes a pre-crash detection device for identifying an imminent application of force on the outer side of the supporting structure from the exterior space. The pre-crash detection device is configured so that, upon identifying an imminent application of force, the detection device triggers a shifting of the receptacle from an inoperative position into an operative position along a direction of movement between the outer side of the motor vehicle seat and the inner side of the supporting structure.

According to another embodiment of the device, the receptacle may be mounted on the motor vehicle seat in a linearly displaceable manner along the direction of movement for shifting from the inoperative position into the operative position. The motor vehicle seat may include a seat back that forms a bearing surface for the back of an occupant of the motor vehicle seat. According to this embodiment, the receptacle may be mounted in the seat back in a linearly displaceable manner along the direction of movement for shifting from the inoperative position into the operative position such that the receptacle is concealed in the inoperative position by an outermost covering of the seat back. Also, the seat back may include a side cheek that protrudes over the bearing surface of the seat back transverse to the direction of movement and is arranged along the direction of movement between an occupant of the motor vehicle seat and the supporting structure, the side cheek being configured to support a body side of the occupant that faces the supporting structure.

According to another embodiment, the restraint device may include a movement generating device configured to interact with the pre-crash detection device and configured to move the receptacle from the inoperative position into the operative position when the pre-crash device identifies an imminent application of force. The movement generating device may include a spring to generate the movement of the receptacle from the inoperative position into the operative position, a relaxation movement of the spring generating the movement of the receptacle.

According to another embodiment, the motor vehicle seat includes a backrest frame as a basic body of a seat back. The receptacle may be mounted on the backrest frame in a linearly displaceable manner along the direction of movement for shifting from the inoperative position into the operative position. In the inoperative position of the receptacle, the aforementioned spring of the movement generating device may be configured to pre-stress the receptacle against the backrest frame such that during a relaxation movement of the spring the receptacle is shifted along the direction of movement into the operative position. The device may include a first locking element movable between a first and second position. When the first locking element is in the first position a relaxation movement of the spring is prevented and when the first locking element moves into the second position the spring is released to thereby move the receptacle from the inoperative position into the operative position by the spring. The first locking element may be mounted on the receptacle such that the first locking element is pivotable between the first and the second position.

The restraint device may include a second movement generating device configured to interact with the pre-crash detection device and to pivot the first locking element from the first position to the second position to release the spring when the pre-crash detection device identifies an imminent application of force to the outer side of the supporting structure. The device may also include a second locking element configured to slide along a region of the backrest frame during the movement of the receptacle between the inoperative position and the operative position, the second locking element being pre-stressed against the region of the backrest frame so that the second locking element can enter into engagement with at least one recess formed in the region of the backrest frame as the second locking element slides along the region of the backrest frame. The at least one recess may be configured to form an abutment for the receptacle, the abutment absorbing the forces acting on the receptacle counter to the direction of movement so the receptacle cannot be displaced counter to the direction of movement when the second locking element is in engagement with the at least one recess. The restraint device may include a plurality of recesses are formed in the region of the backrest frame, the second locking element capable of engaging the plurality of recesses as the second locking element slides along the region of the backrest frame. According to one embodiment, the second locking element may be a lever that is pivotable between a first and second position, the lever not in engagement with the at least one recess when in the first position and in engagement with the at least one recess when in the second position, the lever being pre-stressed in the direction of the second position when in the first position.

The priority application, German Patent Application No. 10 2005 062 849.4, filed Dec. 23, 2005 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An occupant restraint device for a motor vehicle, comprising:
   a supporting structure of the motor vehicle comprising an outer side facing an exterior space of the motor vehicle and an inner side facing an interior of the motor vehicle;
   a motor vehicle seat comprising an outer side facing the inner side of the supporting structure;
   an airbag configured to deploy to restrain an occupant upon an application of force on the outer side of the supporting structure from the exterior space;
   a receptacle of the airbag arranged on the outer side of the motor vehicle seat;
   an openable region of the receptacle through which the airbag can be deployed into the interior of the motor vehicle; and
   a pre-crash detection device for identifying an imminent application of force on the outer side of the supporting structure from the exterior space,
   wherein, upon identifying an imminent application of force, the pre-crash detection device is configured to trigger a shifting of the receptacle from an inoperative position into an operative position along a direction of movement between the outer side of the motor vehicle seat and the inner side of the supporting structure, the receptacle moving along a vehicle transverse axis direction, and
   wherein the receptacle in the operative position is supported on the inner side of the supporting structure to oppose a deformation of the supporting structure counter to the direction of movement in the event of an application of force acting on the outer side of the supporting structure.

2. The occupant restraint device as claimed in claim 1, wherein the shifting of the receptacle from the inoperative position into the operative position positions the openable region between the inner side of the supporting structure and the outer side of the motor vehicle seat so that the airbag may deploy transverse to the direction of movement between the inner side of the supporting structure and the outer side of the motor vehicle seat.

3. The occupant restraint device as claimed in claim 1, wherein the airbag upon inflation is configured to be deployed along a longitudinal axis of the vehicle in a straight ahead direction of travel.

4. The occupant restraint device as claimed in claim 1, further comprising:
   a movement generating device configured to interact with the pre-crash detection device and configured to move the receptacle from the inoperative position into the operative position when the pre-crash detection device identifies an imminent application of force.

5. The occupant restraint device as claimed in claim 4, wherein the pre-crash detection device is configured to generate a first output signal to trigger the movement generating device to shift the receptacle from the inoperative position into the operative position when an imminent application of force to the outer side of the supporting structure is identified.

6. The occupant restraint device as claimed in claim 4, wherein during the shifting into the operative position the receptacle is pressed against the supporting structure along the direction of movement by the movement generating device in such a manner that the motor vehicle seat is deformed counter to the direction of movement to maintain a deployment space of the airbag.

7. The occupant restraint device as claimed in claim 4, wherein the receptacle is shifted along the direction of movement by the movement generating device only to the extent that the receptacle touches the inner side of the supporting structure in the operative position.

8. The occupant restraint device as claimed in claim 4, wherein during the shifting into the operative position the receptacle is pressed against the inner side of the supporting structure by the movement generating device to shift the motor vehicle seat away from the supporting structure counter to the direction of movement.

9. The occupant restraint device as claimed in claim 1, further comprising:
   a gas generator for inflating the airbag, the gas generator configured to release a gas to inflate the airbag when the receptacle is in the operative position.

10. The occupant restraint device as claimed in claim 9, wherein the pre-crash detection device is configured to generate an output signal to activate the gas generator and inflate the airbag when the receptacle is in the operative position and when an imminent application of force to the outer side of the supporting structure is identified.

11. The occupant restraint device as claimed in claim 9, further comprising:
a crash sensor for interacting with the gas generator, the crash sensor configured to trigger the gas generator to inflate the airbag when the receptacle is in the operative position and when an application of force to the outer side of the supporting structure is detected.

12. The occupant restraint device as claimed in claim 9, wherein the receptacle surrounds the airbag and the gas generator.

13. The occupant restraint device as claimed in claim 1, wherein the receptacle comprises a rigid housing.

14. The occupant restraint device as claimed in claim 1, wherein the motor vehicle seat comprises a seat back that forms a bearing surface for the back of an occupant of the motor vehicle seat, the seat back comprises a side cheek that protrudes over the bearing surface of the seat back transverse to the direction of movement and is arranged along the direction of movement between an occupant of the motor vehicle seat and the supporting structure, the side cheek being configured to support a body side of the occupant that faces the supporting structure, and
wherein the receptacle is mounted in the seat back in a linearly displaceable manner along the direction of movement for shifting from the inoperative position into the operative position such that it presses the side cheek counter to the direction of movement and against the body side of the occupant when the receptacle presses along the direction of movement against the inner side of the supporting structure during the movement into the operative position.

15. The occupant restraint device as claimed in claim 1, wherein when an identified application of force to the outer side of the supporting structure does not occur, the pre-crash detection device provides an output signal to shift the receptacle from the operative position to the inoperative position.

16. The occupant restraint device as claimed in claim 1, wherein the motor vehicle seat is a driver seat or a front passenger seat of the motor vehicle.

* * * * *